United States Patent
Hundebøl

(12) 
(10) Patent No.: US 6,257,877 B1
(45) Date of Patent: Jul. 10, 2001

(54) KILN PLANT AND METHOD FOR MANUFACTURING CEMENT

(75) Inventor: Søren Hundebøl, Copenhagen (DK)

(73) Assignee: F. L. Smidth & Co. (DK)

( * ) Notice: Subject to any disclaimer, the term of this patent is extended or adjusted under 35 U.S.C. 154(b) by 0 days.

(21) Appl. No.: 09/586,111

(22) Filed: Jun. 2, 2000

Related U.S. Application Data

(63) Continuation of application No. PCT/EP99/00487, filed on Jan. 26, 1999.

(30) Foreign Application Priority Data

Apr. 2, 1998 (DK) .................................................. 0153/98

(51) Int. Cl.⁷ .................................................. F27B 15/02
(52) U.S. Cl. .................................................. 432/58; 432/14
(58) Field of Search .................................................. 432/14, 15, 58, 432/106; 110/245, 345, 347; 106/745, 758

(56) References Cited

U.S. PATENT DOCUMENTS

| 3,998,596 | * | 12/1976 | Fukuda et al. | .......................... | 432/58 |
| 5,349,910 | * | 9/1994 | Hundebol | .............................. | 432/14 |
| 5,919,038 | * | 7/1999 | Labelle et al. | ......................... | 432/14 |
| 5,975,891 | * | 11/1999 | Hundebol | ............................... | 432/58 |

* cited by examiner

Primary Examiner—Gregory Wilson

(74) Attorney, Agent, or Firm—Baker Botts L.L.P.

(57) ABSTRACT

The present invention relates to a kiln plant and a method for manufacturing cement. The kiln plant comprises a kiln for burning clinker, a cooler, a calciner followed by a separation cyclone and a burning compartment which is fed tangentially with tertiary air from the cooler. Completely or partially calcined material is routed from the bottom of the burning compartment to the calciner to which exhaust gases from kiln are also vented.

The object of the invention is to provide a kiln plant and a method for manufacturing cement. The kiln plant is of a relatively simplified construction and it may advantageously burn fuel with a low reactivity, such as petcoke, anthracite and other grades of coal with a low gas content in the calcining zone.

This object is obtained by locating the tangential inlet of the burning compartment so that the height of the upper part of the inner volume of the burning compartment, $h_1-h_2$, which is located below the burner tip and above the upper edge of the tangential inlet, is at least $\frac{1}{3} \cdot D$, where D is the diameter of that cylinder with the height $h_1-h_2$ and the same volume as the upper volume of the burning compartment, and that the height of the lower part of the inner volume of the burning compartment, $h_3-h_4$, being located between the lower edge of the tangential inlet and the outlet from the burning compartment, is at least D. Preferably, the height of the upper part of the inner volume of the burning compartment, $h_1-h_2$, should be at least $\frac{2}{3} \cdot D$ and the height of the lower part of the inner volume of the burning compartment, $h_3-h_4$, should be at least D.

9 Claims, 2 Drawing Sheets

KILN PLANT AND METHOD FOR MANUFACTURING CEMENT

This is continuation of copending International application No. PCT/EP99/00487 filed Jan. 26, 1999.

BACKGROUND OF THE INVENTION

The present invention relates to a kiln plant and a method for manufacturing cement. The kiln plant comprises a kiln for burning clinker, a cooler, a calciner followed by a separation cyclone and a burning compartment which is fed tangentially with tertiary air from the cooler. Completely or partially calcined material is routed from the bottom of the burning compartment to the calciner to which exhaust gases from the kiln are also vented.

It is a recognized fact that a number of advantages may be achieved by constructing a calcination zone equipped with an extra burning compartment which is exclusively fed with tertiary air from the cooler.

A plant of this type is described in our EP-A-103423. From this patent is known a plant (SLC-S) for calcination of cement raw materials, in which due allowance has been made for the inherent difficulty in achieving a complete burn-out of the fuel which is utilized in the calciner. In this plant the raw material is fed, after being preheated, to a burning compartment (4) in which it is calcined in hot air from the cooler (2). The tertiary air from the cooler flows centrally up through the bottom of the burning compartment (4) which means that there is an upward flow centrally in the burning compartment and a downward flow along the sides of the burning compartment. The raw material is fed at the lower end of the burning compartment and is distributed subject to the action of the turbulent flow encountered across the entire length of the burning compartment.

From U.S. Pat. No. 4,014,641 is known a plant for the calcination of cement raw materials in which the quantity of nitrogen oxide in the exhaust gases of the kiln is reduced by generating a zone in the kiln discharge duct to which reducing gas is fed. Hot air from the cooler and hot gas from the kiln are via a duct (5) and a duct (13), respectively, routed to a cyclone preheater (14,15,16,17) in which raw material is preheated in counter-current to the hot gas from the cooler and from the kiln. In the area of the kiln discharge duct which is located below the feed duct (5) from the cooler, reducing conditions are generated by introducing reducing gases via a duct (12). The reducing gases are formed in the calciner (8) since the air volume which is fed to the calciner is sufficient to cause gasification of the fuel in the calciner but insufficient to cause complete burn-out of the fuel in the calciner (col. 4, lin. 1–5). A disadvantage of this plant is that fuels which are difficult to ignite and slow-burning such as petcoke, anthracite and other grades of coal with a low gas content cannot be utilized in the calciner since they would produce a substantial unburned coke residue which would be precipitated and led to the rotary kiln, subsequently giving rise to problems in terms of sulphur expulsion and formation of cakings.

From U.S. Pat. No. 5,364,265 is known yet another calcining system in which the $NO_x$ emission is limited by formation of reducing gases, viz. Co and $H_2$, in a burning compartment (20). The coke formed in the burning compartment during this process exhibits quite distinctive reactive properties. However, optimization of this method is relatively difficult to achieve in respect of ensuring minimum $NO_x$ emission given that very few parameters can be controlled during operation. The firing process in the burning compartment depends entirely on the desired degree of calcination of the raw meal. At the same time, the complexity of the plant structure is relatively high.

From our international patent application No. PCT/DK 97/00029 is known a method for reducing the NOx rate of emission from a plant. The object of this invention is to provide a method for operating a kiln plant with a reduced $NO_x$ emission rate, while, simultaneously, providing the option of using fuel with a low reactivity, such as petcoke, anthracite and other grades of coal with a low gas content in zones with a relatively low temperature. This object is obtained by regulating the fuel input rates in three different zones, with exhaust gases being fed to one zone from the two other zones in a way ensuring minimization of the NO-content in the exhaust gases from the zone to which exhaust gases are vented from the two other zones.

The object of the present invention is to provide a kiln plant and a method for manufacturing cement. The kiln plant is of a relatively simplified construction and it may advantageously burn fuel with a low reactivity, such as petcoke, anthracite and other grades of coal with a low gas content in the calcining zone where the temperature is generally at a low level.

BRIEF SUMMARY OF THE INVENTION

According to the present invention, a kiln plant for manufacturing cement, said plant comprising a kiln, a cooler, a calciner with subsequent separation cyclone, a burning compartment provided at its upper part with a central burner, and featuring below the burner a tangential inlet through which hot gas is fed, via a duct, from the cooler to the burning compartment, said duct being provided with an inlet for raw meal, the lower part of the burning compartment being provided with a connection to the calciner, and a second connection directing the exhaust gases from the kiln to the calciner; is characterised in that the height $h_1-h_2$ of the upper part of the inner volume of the burning compartment, between the tip of the burner and the upper edge of the tangential inlet, being the uppermost point of entry of hot gas from the cooler is at least ⅓D, where D represents the diameter of a cylinder having the height $h_1-h_2$ and the same volume as the upper part of the inner volume of the burning compartment; and in that the height of the lower part of the inner volume of the burning compartment, $h_3-h_4$, being situated between the lower edge of the tangential inlet, being the lowermost point of entry of hot gas from the cooler, and the outlet from the burning compartment, is at least D.

This object is thus obtained, when the burning compartment is cylindrical by locating the tangential inlet of the burning compartment so that the height of the upper part of the inner volume of the burning compartment, $h_1-h_2$, which is located below the burner tip and above the upper edge of the tangential inlet, is at least ⅓D and so that the height of the lower part of the inner volume of the burning compartment, $h_3-h_4$, which is located between the lower edge of the tangential inlet and the outlet from the burning compartment, is at least D. Preferably, the height of the upper part of the inner volume of the burning compartment, $h_1-h_2$, should be at least ⅔D and the height of the lower part of the inner volume of the burning compartment, $h_3-h_4$, should be at least 3/2D.

This will result in that a space with a high temperature and a low content of raw materials will be generated over the tangential inlet of the raw material suspension. This will ensure improved ignition and combustion characteristics of low-cost and gas-deficient grades of coal.

The invention also includes a method for manufacturing cement in a plant according to the invention, wherein the raw materials are preheated and then subjected to at least partial calcination in a burning compartment which at its upper part is provided with a central burner; where raw materials are fed to the burning compartment via a tangential inlet suspended in hot gas from a cooler; the partially calcined material is passed from the lower part of the burning compartment via a connection to a calciner, the gas/material suspension is passed from the calciner to a separation cyclone, in which a separation of gas and material is effected, and where exhaust gases from the kiln are directed to the calciner via a second duct, CHARACTERIZED IN THAT the height $h_1$–$h_2$ of the upper part of the inner volume of the burning compartment, between the tip of the burner and the upper edge of the tangential inlet, being the uppermost point of entry of hot gas from the cooler is at least ⅓D, where D is the diameter of a cylinder with the height $h_1$–$h_2$ and the same volume as the upper part of the inner volume of the burning compartment; and in that the height of the lower part of the inner volume of the burning compartment, $h_3$–$h_4$, being situated between the lower edge of the tangential inlet, being the lowermost point of entry of hot gas from the cooler, and the outlet from the burning compartment (3), is at least D.

DESCRIPTION OF THE DRAWINGS

The invention will now be described in further details with reference being made to FIG. 1, which shows an example of a kiln plant according to the invention and FIG. 2, which shows a detailed embodiment of the burning compartment according to the invention

DESCRIPTION OF THE PREFERRED EMBODIMENT

Figure 1:
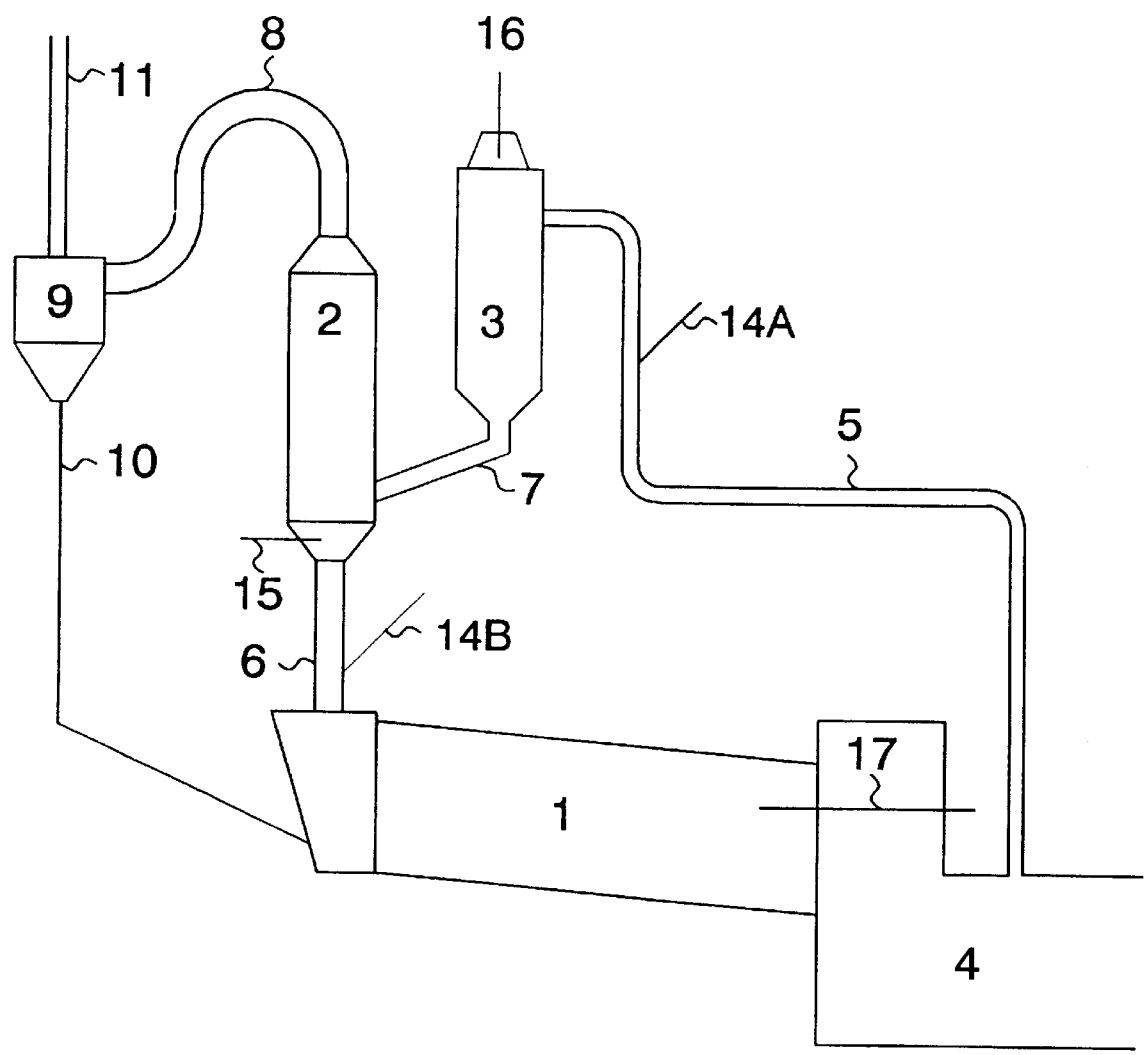

In FIG. 1 is shown a kiln plant for manufacturing cement clinker. The plant consists of a kiln 1 in which the clinker is burned within a temperature range of 1300–1500° C. and a calciner 2 and a burning compartment 3 in both of which the temperature is at least 800° C. and in certain areas may be as high as 1400° C. In certain cases, the calciner 2 may consist exclusively of the riser duct from the kiln 1. After the kiln 1 there is a clinker cooler 4, from which hot air is routed via a duct 5 to the calcining zone which is covered by 3, 2 and 8. The calciner 2 is fed with hot exhaust gases from the kiln 1 via the duct 6 and hot exhaust gases mixed with partially calcined material from the burning compartment 3 via a duct 7.

From the calciner 2 calcined material is routed via a duct 8 in suspension to a separation cyclone 9. In the separation cyclone 9 the gas/material suspension is separated into a stream of calcined material and a stream of hot gas. The calcined raw material is directed via the duct 10 to the rotary kiln 1 and the hot gas is directed via the duct 11 to a suspension preheater.

The preheated raw material is directed down to the calcining zone via two ducts 14A and 14B. If deemed appropriate, preheated raw material may also be fed to the upper part of the calciner 2 via a not shown duct. The duct 14B leads raw material into the exhaust gases from the kiln 1 causing the raw material to be passed to the calciner 2. The duct 14A directs raw material into the tertiary air duct 5 causing the material to be passed to the burning compartment 3.

The entire raw material stream is distributed in controlled manner between the two ducts 14A and 14B, and in special circumstances it may, for example, be desirable to interrupt the flow through one of the ducts. In this plant fuel may be fired in the calciner 2 by means of a burner 15, in the burning compartment 3 by means of a burner 16 and in the kiln 4 by means of a burner 17.

Figure 2:
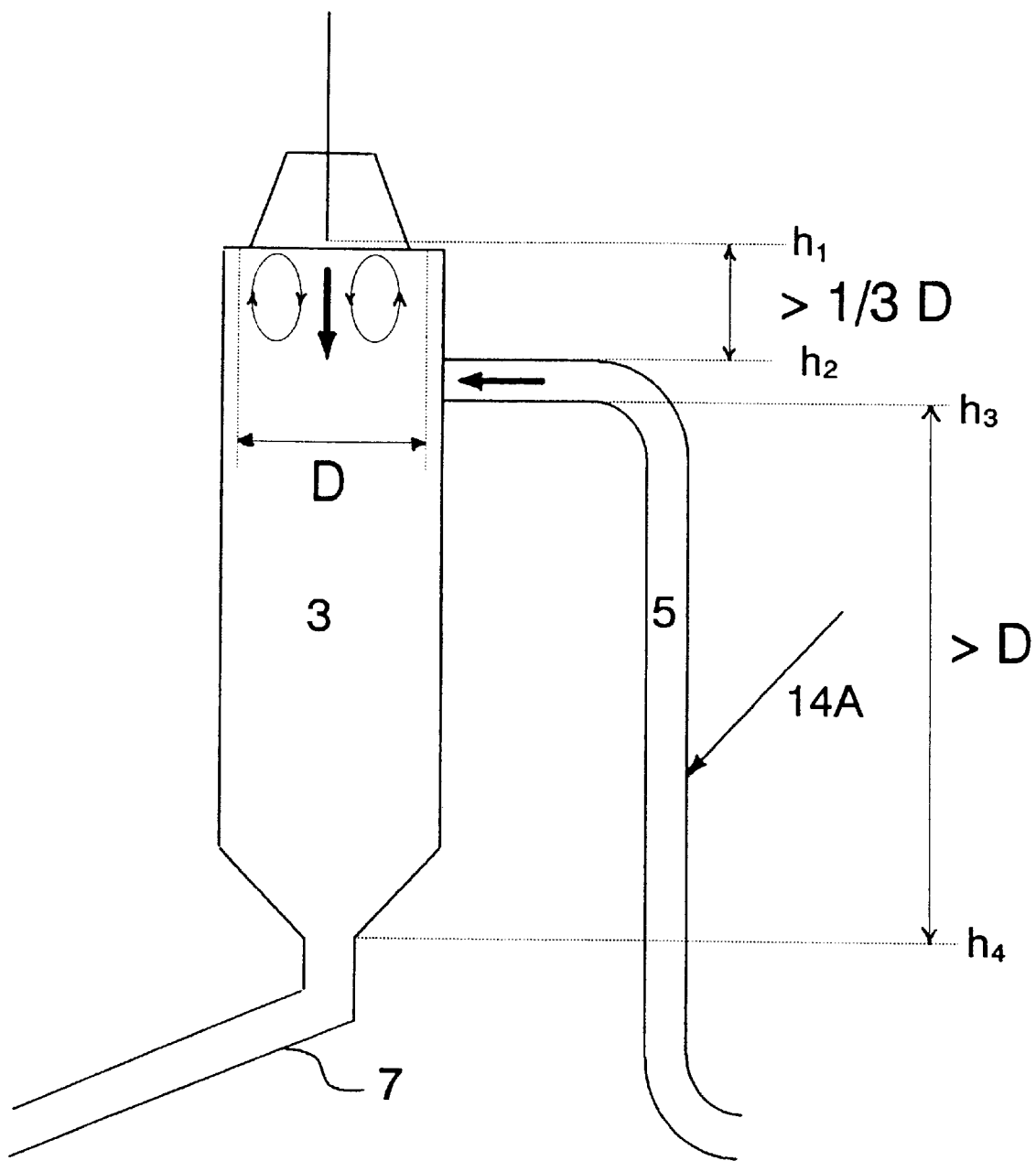

FIG. 2 shows a detailed embodiment of the burning compartment 3 according to the invention where the raw meal from duct 14A is introduced to the burning compartment 3 via the tertiary air duct 5.

In this case the inner reactor volume of the burning compartment is of a cylindrical form. However, the form of the upper reactor volume is not dictated by any specific requirements, except that the size of the cross-sectional area must be sufficient relative to the cross-section of the burner in order to achieve the desired flow characteristics. The upper part of the inner volume of the burning compartment is that part which is located above the inlet of the tertiary air duct, and in FIG. 2 the height of this section is $h_1$–$h_2$. The height of lower part of the inner volume of the burning compartment is $h_3$–$h_4$, and extends from the inlet of the tertiary air duct to the outlet which is located at the lower end of the burning compartment. Experience has shown that $h_1$–$h_2$ must be greater than ⅓D, where D is the diameter of the upper section, when as in the present case it is of a cylindrical form, and that the lower part must be greater than 3/2D before it will be possible to obtain the combination of elevated temperature, time of retention, and mixture which will enhance the burning-out efficiency of the gas-deficient fuel which is introduced via the burner 16.

When, as is the case in conventional plants, the raw meal feed duct is located at the highest possible level in the burning compartment, this basically entails that no coal with a low content of volatiles will be burned in the upper third of the compartment, which means that the temperature is maintained at a level around 800–900° C. In return the temperature at the outlet will rise because of the advanced stage of combustion at this location. As a result, the temperature at the outlet may be as high as 1200° C. which may cause cakings to be generated because of the content of raw meal.

Because of the low position in which the tertiary air inlet is placed, a blending and ignition zone will be generated in the upper part of the burning compartment which is clear of raw meal. The jet stream of primary air through the burner generates the flow pattern illustrated in FIG. 2, in which there is a vertical circulation in the central part of the burning compartment. Given that the tertiary air from the cooler and the raw meal suspended in the airstream is introduced tangentially, the raw meal is thrust by swirling action onto the side of the burning compartment and since the vertical circulation is taking place in the central part of the burning compartment, the content of raw meal in the upper part of the burning compartment will remain at a low level. The impact of the flow pattern will be to produce in the upper part of the burning compartment a gas mixture, some of which will participate at this point in time or at a prior stage in the process of combustion and some of which will be oxygen-containing gas directly from the tertiary air duct. This mixture will trigger the ignition of the cold fuel which is being introduced. It has turned out that the coal consumption in a burning compartment in an experimental plant could be reduced by a factor of approximately 17 per cent after carrying out the method according to the present method, and this is probably ascribable to an enhancement of the coal combustion efficiency.

Consequently, the combustion in the burning compartment is always effected with an oxygen content of less than 21% $O_2$. This has a beneficial effect on the production of $NO_x$ which will be at a somewhat lower level. However, the temperature increase is the most significant factor influencing the production of $NO_x$. It has thus been ascertained that in a plant according to the invention the conversion ratio that can be achieved in terms of converting the nitrogen of the fuel into $NO_x$ will be as low as 25 per cent when burning anthracite and petcoke. By comparison, a traditional calciner may have a ratio of conversion as high as 65 per cent for petcoke. This would indicate that the NO-emission in a plant according to the invention has been reduced by a factor of more than 50 per cent.

What is claimed is:

1. A kiln plant for manufacturing cement, said plant comprising a kiln, a cooler, a calciner with subsequent separation cyclone, a burning compartment provided at its upper part with a central burner, and featuring below the burner an tangential inlet through which hot gas is fed, via a duct, from the cooler to the burning compartment, said duct being provided with an inlet for raw meal, the lower part of the burning compartment being provided with a connection to the calciner, and a second connection directing the exhaust gases from the kiln to the calciner, characterised in that the height, $h_1-h_2$, of the upper part of the inner volume of the burning compartment, between the tip of the burner and the upper edge of the tangential inlet, being the uppermost point of entry of hot gas from the cooler is at least $\frac{1}{3}D$, where D represents the diameter a cylinder would have if said cylinder had the height $h_1-h_2$ and the same volume as the upper part of the inner volume of the burning compartment; and in that the height of the lower part of the inner volume of the burning compartment, $h_3-h_4$, being situated between the lower edge of the tangential inlet, being the lowermost point of entry of hot gas from the cooler, and the outlet from the burning compartment, is at least D.

2. A kiln plant for manufacturing cement according to claim 1, CHARACTERIZED IN THAT the height of the upper part, $h_1-h_2$, is at least $\frac{2}{3}D$.

3. A kiln plant for manufacturing cement according to claim 1, CHARACTERIZED IN THAT the height of the lower part, $h_3-h_4$, is at least $\frac{3}{2}D$.

4. A kiln plant for manufacturing cement according to claim 1, CHARACTERIZED IN THAT the burner (16) at the upper part of the burning compartment (3) is arranged in such a way that primary air is fed through the burner.

5. A method of manufacturing cement in a plant according to claim 1, wherein the raw materials are preheated and then subjected to at least partial calcination in a burning compartment which at its upper part is provided with a central burner, where raw materials are fed to the burning compartment via a tangential inlet suspended in hot gas from a cooler, the partially calcined material is passed from the lower part of the burning compartment via a connection to a calciner, the gas/material suspension is passed from the calciner to a saperation cyclone, in which a separation of gas and material is effected, and where exhaust gases from the kiln is directed to the calciner via a second duct, CHARACTERIZED IN THAT the height $h_1-h_3$ of the upper part of the inner volume of the burning compartments, between the tip of the burner and the upper edge of the tangential inlet, being the uppermost point of entry of hot gas from the cooler is at least $\frac{1}{3} \cdot D$, where D is the diameter a cylinder would have if said cylinder had the height $h_1-h_2$ and the same volume as the upper part of the inner volume of the burning compartment; and in that the height of the lower part of the inner volume of the burning compartment $h_3-h_4$, being situated between the lower edge of the tangential inlet, being the lowermost point of entry of hot gas from the cooler, and the outlet from the burning compartment, is at least D.

6. A method according to claim 5, CHARACTERIZED IN THAT the temperature in the upper volume of the burning compartment is within the range 1100–1400° C.

7. A method according to claim 5, CHARACTERIZED IN THAT the temperature in the upper volume of the burning compartment is within the range 1100–1400° C.

8. A method according to claim 5, CHARACTERIZED IN THAT primary air is fed through the burner (16) to the burning compartment (3).

9. A method according to claim 8, CHARACTERIZED IN THAT the product of the percentage of the primary air being fed to the burning compartment relative to the required stoichiometric air volume for burning coal, and the injection velocity of the coal into the burning compartment measured in m/s is at least 500% ·m/s.

* * * * *